_United States Patent Office_

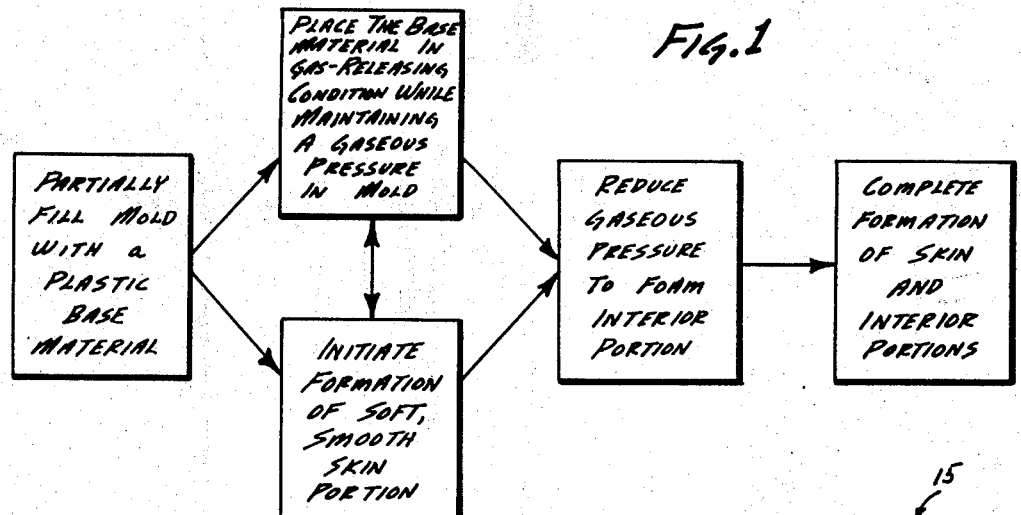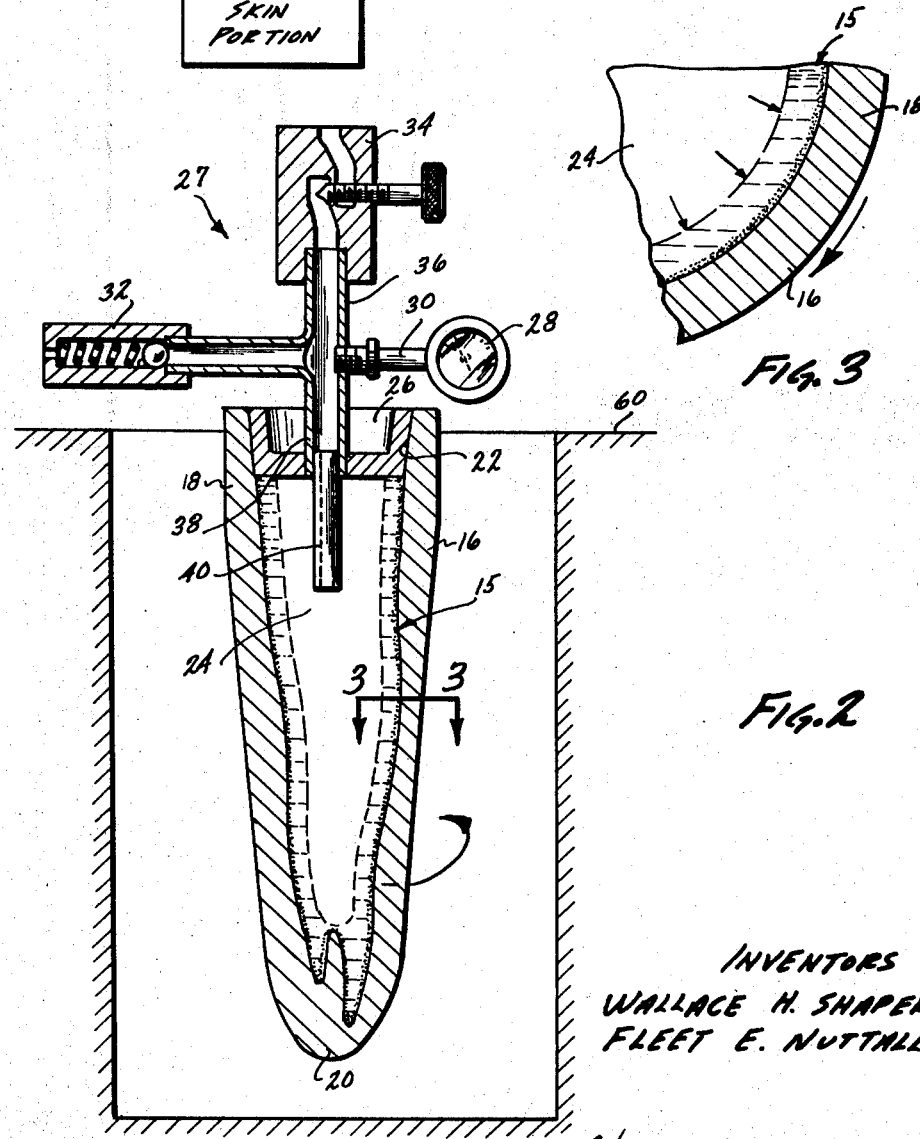

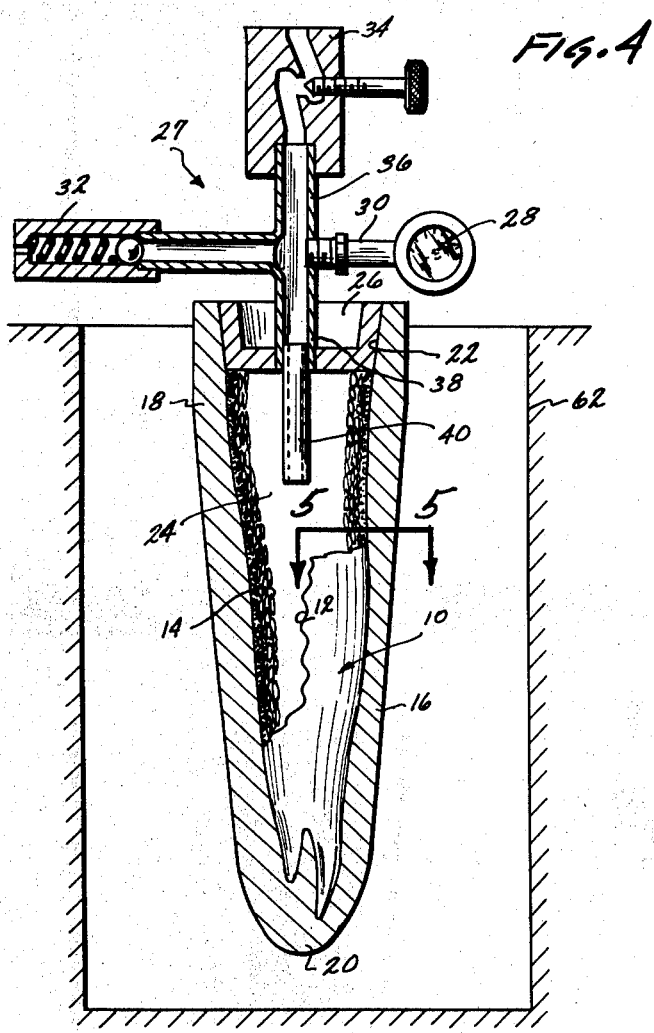
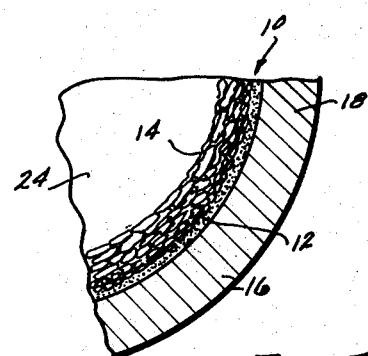
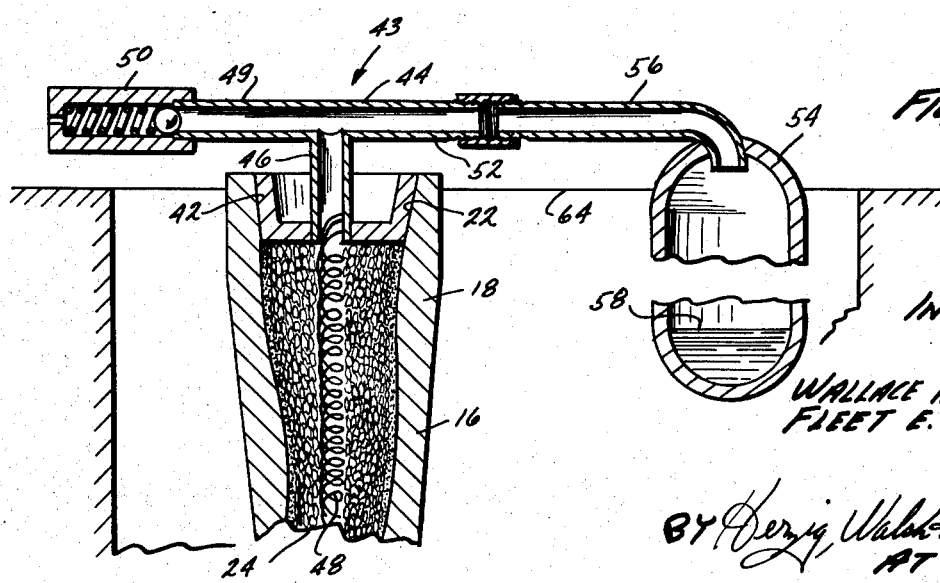

3,541,192
Patented Nov. 17, 1970

3,541,192
METHOD OF PRODUCING PLASTIC OBJECTS HAVING SMOOTH SKIN PORTIONS AND FOAMED INTERIOR PORTIONS
Wallace H. Shapero, Torrance, and Fleet E. Nuttall, Alhambra, Calif., assignors to Mattel, Inc., Hawthorne, Calif., a corporation of California
Filed May 2, 1967, Ser. No. 635,538
Int. Cl. B29d 27/04
U.S. Cl. 264—45                              4 Claims

ABSTRACT OF THE DISCLOSURE

A plastic base material having gas-releasing capability is placed in a mold, which is subjected to a forced internal pressure change to control the timing of the release of the gas (to form the foamed interior portions of an object) while it is treated (as by heating a vinyl plastisol composition in the known rotocasting process) to form a smooth, soft skin and to complete formation of both the skin and interior portions.

BACKGROUND OF THE INVENTION

The background of the invention will be set forth in two parts:

Field of the invention

The present invention relates generally to the field of producing foamed plastic objects and more particularly to such objects which are produced in such a manner that they include smooth, soft skin portions and foamed interior portions, especially those with detailed, sculptured exteriors.

Description of the prior art

In the art of making figure toys, such as dolls, there has been a need for an economical and practical method of making a toy having smooth, soft skin which will not be readily damaged because of the low mechanical strength of the skin. Production of such articles, or closely similar articles, may be obtained by precise control of temperatures, times and material compositions, and such articles have been marketed. These marketed articles have the disadvantages that this precise control increases manufacturing costs and that the skin is comparatively porous.

U.S. Pat. No. 2,819,753 discloses a method of manufacturing rubber articles comprising two layers which are intimately connected to each other by vulcanization. An inner layer is constructed of sponge rubber and an outer layer is constructed of conventional homogeneous rubber. The disclosed method of fabricating such an article includes the steps of (1) forming a plurality of sections from a material comprising an inner layer of unvulcanized rubber containing a foaming agent and an outer layer comprising an unporous, unvulcanized rubber. The several sections are assembled together to form a hollow article having the foaming-agent layer innermost. An expanding agent, which responds to the vulcanizing heat, is placed inside the hollow article and sealed therein. The hollow article is then inflated with compressed air and placed in a mold having the desired final contour of the article. The mold is heated to vulcanize the rubber layers and to activate the foaming and the expanding agents. The foaming agent produces the sponge rubber and the expanding agent urges the rubber layers outwardly against the contour of the mold assisting the air pressure within the hollow article.

This method has the disadvantages that fabrication of the hollow article from the several sections requires a certain degree of skill and dexterity, is time consuming and expensive.

Concerning the general field of producing foamed plastic objects, it is known from U.S. Pat. No. 3,306,960 to mold a foamed plastic structure having a smooth outside surface. Such a structure has the disadvantage that the smooth outside surface is not soft. Other patents, such as U.S. Pats. Nos. 2,901,446; 3,160,689 and 3,268,635, show the use of presses or press molds to prevent expansion of a plastic material upon decomposition or release of a blowing agent. The products produced by the methods disclosed in these patents, however, have the disadvantage that they do not include a smooth, soft skin portion.

SUMMARY OF THE INVENTION

In view of the foregoing factors and conditions characteristic of methods of producing foamed plastic objects, it is a primary object of the present invention to provide a new and useful method of making foamed plastic objects not subject to the disadvantages enumerated above and which produces a plastic object having a smooth, soft skin portion and a foamed interior portion, capable of reproducing closely both the detail and dimensions of a mold.

Another object of the present invention is to provide a method of making plastic objects having soft, smooth skin and a foamed interior portion which may employ a comparatively broad range of composition of the base material, time, temperature and pressure controls.

Still another object of the present invention is to provide a method of the type described which includes simple mechanical control of the timing of the release of a blowing agent in a plastic base material, thereby facilitating the manufacture of foamed plastic objects on a mass-production basis.

Yet another object of the present invention is to provide a new and useful method of producing foamed plastic objects which includes the step of initiating the forming of a smooth, soft skin portion in a base material having gas-releasing properties while limiting release of gas from said base material.

A further object of the present invention is to provide a method of making appendages for figure toys which provide an appendage faithfully reproducing mold details and dimensions while being lighter and having a better feel than conventional appendages.

According to the present invention, a plastic object having a soft, smooth skin portion and a foamed interior portion is produced from a plastic base material having gas-releasing capability by partially filling a mold defining the shape and size of the object with the base material. The base material is then treated to place it in a gas-releasing condition while maintaining a gaseous pressure in the mold so as to limit the release of gas from the base material. The formation of a soft, smooth skin is initiated by at least partially solidifying the surface portion of the base material which is in contact with the mold. This step may be followed by the formation of the foamed interior portion by reducing the gaseous pressure within the mold. The base material is then treated so as to complete formation of the smooth, soft skin portion and of the foamed interior portion. The order of these steps may be altered, as described hereinafter, or they may be preformed partially or wholly simultaneously.

The skin portion may well have a cellular structure, but the cells are significantly smaller than those of the "foamed" interior portion. In a doll limb, for example, the skin will have an appearance and "feel" closely simulating human skin, while the interior portion, in cross-section, resembles a sponge.

The features of the present invention which are believed to be novel are set forth with particularity in the appended claims. The present invention, both as to its organization and method steps, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is a flow diagram illustrating certain method steps which may be employed in carrying out the method of the present invention;

FIG. 2 is a cross-sectional view showing a mold and associated apparatus, which may be used in connection with the method steps of FIG. 1, during the initiation of the formation of a smoth, soft skin portion of a foamed plastic object;

FIG. 3 is an enlarged, partial cross-sectional view taken along line 3—3 of FIG. 2;

FIG. 4 is a cross-sectional view of the mold and apparatus of FIG. 2 showing the plastic object after all of the steps of FIG. 1 have been performed;

FIG. 5 is an enlarged, partial cross-sectional view taken along line 5—5 of FIG. 4; and FIG. 6 is a partial cross-sectional view of the mold of FIG. 2 in combination with a second embodiment of associated apparatus and a plastic object made by the method of the present invention.

DESCRIPTION OF THE PREFERRED EMBODIMENT

The method of the present invention may be employed to produce a plastic object, generally designated 10 in FIG. 4 which includes a soft, smooth skin portion 12 and a foamed interior portion 14. The plastic object 10 is shown herein for purposes of illustration, but not of limitation, as comprising a limb for a figure toy (in which detailed sculpturing of the smooth surface, reasonably exact dimensional control, and a soft, pliable "feel" to the finished product are typically very important) and may be made from a plastic base material 15 (FIGS. 2 and 3) having gas-releasing capability. Such a base material may be prepared from known plastic materials, such as those disclosed in U.S. Pat. No. 3,293,094 by employing known blowing agents such as those disclosed therein, to give the base material gas-releasing capability, and by employing suitable plasticizers and other compounds well known to those skilled in the art to produce a soft product having a satisfactory color. Many other plastics, known to the art, with suitable blowing agents, may also be employed as illustrated in U.S. Pats. Nos. 2,901,446; 3,144,493; 3,160,689; 3,200,176; 3,268,635 and 3,306,906. One specific example of a suitable plastisol base material, given herein for purposes of illustration, but not of limitation, is as follows:

| Material: | Parts by wt. |
| --- | --- |
| Polyvinyl chloride resin | 100 |
| Dioctyl phthalate | 53 |
| Dioctyl sebacate | 10 |
| Polyester plasticizer | 8 |
| Epoxy plasticizer | 2 |
| Neutral calcium Petronate foam cell stabilizer | 2 |
| Color pigment | 2 |
| Heat stabilizer | 3 |
| Azodicarbonamide powder | 3 |

From 15 to 200 parts by weight of plasticizer per hundred parts of resin may be employed and mixtures of two, three or more may be used to obtain some preferred characteristics of each. This is true also of the resin and all other ingredients, as is well known in the art.

A suitable mold, such the the mold shown at 16 in FIGS. 2, 4 and 6, may be partially filled with base material 15 which is then treated in a manner to be hereinafter described to produce the plastic object 10.

The mold 16 includes an encompassing side wall 18, a closed bottom wall 20 and an open top 22 and is provided with a suitable cavity 24 which is sculptured to produce a plastic object 10 having a predetermined shape and size.

The mold 16 shown in FIGS. 2 and 4 may be closed by a cap 26 which is placed in open top 22 in such a manner that a substantially gas-tight container 27 is formed. The cap 26 carries a pressure-relief valve 32 and a shut-off valve 34 which communicate with cavity 24 through a T-shaped fitting 36. The fitting 36 includes a leg 38 which carries a ceramic rod 40 disposed within cavity 24 when the cap 26 is in position in open top 22. The rod 40 has sufficient porosity to permit ingress and egress of a suitable gas while preventing the base material 15 from escaping from cavity 24. The pressure in cavity 24 is sensed by a gauge 28 which is connected to fitting 36 by a nipple 30.

The mold 16 shown in FIG. 6 may be closed with a cap 42 to form a substantially gas-tight container 43. The cap 42 carries a T-shaped fitting 44 having a leg 46 communicating with cavity 24. This leg 46 carries a bundle of helically twisted wires 48 having sufficient space between wires to permit the ingress and egress of steam or gas while preventing the base material from escaping from cavity 24. The fitting 44 also includes a leg 49 which carries a pressure-relief valve 50 and a leg 52 which is connected to a steam generator 54 by a conduit 56. The steam generator 54 may carry a suitable quantity of water 58 or other suitable liquid capable of creating a gaseous pressure in cavity 24.

In carrying out the method of the present invention, the mold 16 may be partially filled with base material 15. The base material 15 may then be treated in a predetermined manner to initiate formation of skin portion 12 and to place the base material in a gas-releasing condition while maintaining a gaseous pressure in mold 16 so as to limit the release of gas from the base material.

Formation of skin portion 12 may be initiated either before, simultaneously with or after the placing of the base material in a gas-releasing condition. It may be accomplished by coating the interior surface of a mold with the base material in the know "slush molding" method, by rotating a closed, unpressurized mold around a plurality of axes in a circulating hot air oven at approximately 300° F. for approximately four minutes, or by alternately placing an open mold in a 390° F. oven for fifteen seconds, withdrawing the mold and rotating the mold by hand in order to coat the interior surface of the mold with a gelled layer of base material. Additionally, treating the base material in a predetermined manner may comprise introducing air into the mold at a pressure of approximately 140 p.s.i. and rotating the mold about a plurality of axes in a 390° oven for approximately eight minutes to both initiate formation of skin portion 12 and to place the base material in a gas-releasing condition while limiting the release of gas from the base material.

After the base material has been treated, the foamed interior portion 14 may be formed by reducing the gaseous pressure within mold 16 while maintaining skin portion 12 at a cooler temperature than that experienced thereby during treatment in said predetermined manner. In the practice of this invention, the maintenance of the skin portion in a partially or substantially "unblown" (i.e., unfoamed) condition while "blowing" or foaming of the interior portion takes place is a principal objective.

Specific examples of the method of the present invention are set forth as follows:

EXAMPLE I 20 grams of a base material having the formulation heretofore listed as a specific example was placed in a copper mold 16 having an 80 ml. cavity 24.

Mold 16 was then closed to form a substantially gas-tight container 27 by placing cap 26 and its associated gauge 28, pressure-relief valve 32 and shut-off valve 34 in open top 22.

The mold 16 and the base material were then treated by introducing the container 27 into a circulating, hot-air oven 60 (FIG. 2) at 300° F. and the container 27 was rotated for four minutes to gel the base material 15. Mold 16 and its associated equipment was withdrawn from oven 60 and compressed air was introduced into the mold 16 through valve 34 until the pressure in cavity 24 reached 70 p.s.i. The mold was immersed in a bath of molten salt, not shown, at 375° F. for approximately 4 minutes. At this time, the pressure within cavity 24 stood at approximately 140 p.s.i. The container 27 was then withdrawn from the salt bath and immersed in a water tank 62 (FIG. 4) at 70° F. and quenched for approximately 6 seconds to create a cooler state in skin portion 12 where it lies in contact with mold 16. At this time, the internal pressure in mold 16 was reduced by opening valve 34. Release or expansion of gas from the blowing agent in base material 15 proceeded freely, forming foamed interior portion 14.

Because of the cooler state of skin portion 12, the blowing there in is less vigorous, and a smooth skin is generated. The gelled base material is not highly conductive, so that the interior portions of the material are significantly hotter than the portions in contact with the mold walls. The released gas escaped through valve 34, which may be regulated. It has been found that a slow release of gas may produce a better foamed structure than a sudden release. A one minute release exemplifies a "slow release."

The container 27 was retained in tank 62 for several minutes to complete the formation of skin portion 12 and cool foamed interior portion 14. The mold was then opened and plastic object 10 was withdrawn and observed. The skin portion 12 was soft and smooth having a relatively high density and appearing solid to the unaided eye; the interior portion 14 was well foamed and flexible.

EXAMPLE II

About 20 grams of the base material used in Example I was placed in the mold 16 used in Example I.

The mold 16 was closed by cap 26 and its associated apparatus and an air pressure of 140 p.s.i. was introduced into cavity 24.

The base material was then placed in a gas-releasing condition, while maintaining the air pressure in the mold so as to limit gas release, by rotating container 27 about a plurality of axes in a rotocast oven having an air temperature of 390° F. The container 27 was withdrawn from the oven after about 8 minutes and immersed in a water tank at 70° F. for ten seconds.

Valve 34 was then opened and the pressure in cavity 24 was reduced to atmospheric pressure.

Forming of the interior portion 14 then proceeded by release and expansion of gas from the blowing agent.

The container 27 was left in the water tank for four minutes, completing formation of the skin portion 12 and solidification of the interior portion 14.

The container 27 was then withdrawn from the water tank and immersed in a hot water bath at 175° F. for four seconds to soften the exterior of the skin 12 to permit easier extraction of the plastic object 10 from the mold 16.

EXAMPLE III

Approximately 20 grams of base material from Example I was introduced into a mold 16 which was left open.

The open mold was placed in a hot air oven 64 (FIG. 6) having a temperature of approximately 390° F. and withdrawn every fifteen seconds to rotate the mold by hand, coating the interior surface of the mold evenly with a gelled thickness of base material.

The mold 16 was then fitted with cap 42 and the associated fittings and generator 54 shown in FIG. 6 forming a substantially gas-tight container 43. The pressure-relief valve 50 was set to release at 100 p.s.i. and the gas-tight container 43 was placed in the oven 64 at approximately 390° F. and left there for approximately 14 minutes to increase the pressure in cavity 24 by generating steam in generator 54.

The gas-tight container 43 was then removed from oven 64 and immersed in water at 70° F. for seven minutes to form skin portion 12 and to condense the steam. Valve 50 was then opened and it was noted that a positive pressure was released indicating that the steam may not have completely displaced the other gases in the mold.

Container 43 was then withdrawn from the water and opened. The interior portion 14 was observed to have foamed sufficiently to fill the mold and tightly encompass wire bundle 48.

In an alternate embodiment of Example III, the same steps are followed commencing with 20 grams of a first base material the same as that in Example I, but omitting the 3 parts azodicarbonamide, the blowing agent. The interior surface of the mold was coated evenly with a gelled thickness of this base material and the remaining material (not required for the coating) was replaced by a second base material comprising the one used in Example I. The mold 16 was fitted with cap 42, the associated fittings and generator 54 and the remaining steps of the first embodiment of Example III were understaken.

EXAMPLE IV

Approximately five percent by weight of methylene chloride was added to the base material used in Example I and approximately 20 grams of the resulting base material was introduced into the mold 16.

The mold was closed with the cap 26 and related equipment shown in FIG. 2 to form a substantially gas-tight container 27. This container 27 was alternately placed inside the hot-air oven 60 at 390° F. for fifteen seconds and then withdrawn and rotated by hand until the base material gelled on the interior surface of mold 16.

The container 27 was then placed in the oven 60 at approximately 390° F. for twelve minutes and the pressure in cavity 24 increased to approximately 60 p.s.i., due partly to the expansion of the air which was trapped therein when container 27 was closed, but also due to the release of volatile components from the methylene chloride in the base material, and to the generation of gas from the azodicarbonamide. The mold was then quenched in a water bath at approximately 70° F. and the skin portion 12 was at least partially solidified.

The container 27 was then vented by opening valve 34. Container 27 and the plastic object therein contained were permitted to cool to room temperature.

EXAMPLE V

The azodicarbonamide content of the base material used in Example I was reduced to 1 part by weight and approximately 20 grams of the resulting base material was introduced into the mold 16.

The mold was then closed with the cap 26 and the associate fittings shown in FIG. 2 forming a substantially gas-tight container 27.

Forming of the plastic object 10 was initiated by treating the mold and the base material for about eight minutes in hot-air oven 60 at approximately 390° F. while container 27 was rotated about more than one axis. The thermal expansion of air entrapped within cavity 24, the release of volatile components from the base material and the generation of gas from the azodicarbonamide caused the development of approximately 15 p.s.i. of internal pressure. The container wa withdrawn from oven 60 at the end of the eight minute period and was then quenched in a 70° F. water bath for seven seconds.

Formation of skin portion 12 had proceeded by partial solidification of the surface portion of the base material where it was in contact with the mold.

The valve 34 was then opened and connected to a vacuum pump which drew approximately 30 inches of mercury. After approximately one minute, the valve 34 was closed and the vacuum pump removed.

The mold was permitted to remain in the water bath for an additional four minutes. Formation of skin portion 12 and solidification of interior portion 14 was completed.

The mold was then withdrawn from the water, valve 34 was opened and the cap 26 removed. The finished plastic object 10 was then removed from the mold.

In cases where a combination of heating and quenching is used, sequential cooling of the skin prior to cooling of the interior portions (when both skin portion 12 and interior portion 14 have first been sufficiently heated), with gas release occurring before completion of cooling interior portion 14, is employed to produce a smooth skin and foamed interior portion.

Applicants have set forth their best present understanding of the manner in which various embodiments of the method of the present invention operate, but are not certain that their theories as to why the steps of the process work are correct; they merely know that if performed as herein described, the steps do work.

It may be noted, however, that a differential pressure and selective cooling play a significant role when vinyl resins are employed, as in each of the specific examples set forth herein. It should also be noted that the pressures employed in Example I produced a denser skin portion 12 and a generally better product (especially with reference to smoothness and uniformity of the outer skin) than the lesser pressures employed in some of the other examples. However, the objects 10 produced by each example are satisfactory for use in most structures where it is desirable to have a soft, smooth skin.

As used herein, the terms "gas" and "gaseous" include air, and the phase "drawing a vacuum" means any forced withdrawal of gas from a mold.

While the particular method of producing plastic objects herein shown and described in detail is fully capable of attaining the objects and providing the advantages hereinbefore stated, it is to be understood that it is merely illustrative of the presently preferred embodiment of the invention and that no limitations are intended to the details of construction, design or the method steps herein set forth ot her than as defined in the appended claims, which form a part of this disclosure.

What is claimed is:

1. A method of producing a solid plastic object having a smooth, soft skin portion and a foamed interior portion from polymeric plastisol materials comprising the steps of:
    filling a mold defining the shape and size of said plastic object with a first plastisol;
    heating said mold at an elevated temperature to gel a layer of said first plastisol adjacent the mold walls;
    removing the remaining first plastisol from said mold;
    gelling a layer of a second expandable plastisol having gas-releasing capability on said first plastisol;
    injecting a gas into said mold so as to raise the pressure in said mold to a point sufficient to prevent release of gas in said second plastisol;
    heating said mold to a temperature sufficient to cause release of said gas in said second plastisol;
    cooling said mold sufficiently to cool only the surface portion of said base material which is adjacent said mold while maintaining the interior portion of said base material at a higher temperature; and
    releasing said pressure to form said foamed interior portion.

2. A method of producing a solid foamed polymeric object having a smooth exterior and a foamed interior portion from an expandable plastisol composition containing a suitable blowing agent comprising:
    gelling a layer of said plastisol composition of the interior of said mold,
    heating said gelling layer to a temperature sufficient to activate said blowing agent, while maintaining said mold at an internal pressure sufficient to prevent release of gas from the blowing agent,
    cooling the exterior of the mold by placing the mold in a cooling environment having a temperature below the temperature sufficient to activate said blowing agent,
    releasing the pressure in said mold while maintaining it in said cooling environment whereby said plastisol is caused to foam within said mold, and
    removing the resultant foamed product from said mold.

3. The method of claim 2 comprising:
    cooling the exterior of said mold by placing said mold in a water bath.

4. The method of claim 2 comprising:
    keeping said mold in said cooling environment after the plastisol has been foamed for a period of time sufficient to cool the entire foamed product.

References Cited

UNITED STATES PATENTS

| | | | |
|---|---|---|---|
| 2,730,765 | 1/1956 | Crafton et al. | 264—310 XR |
| 2,829,117 | 4/1958 | Lindemann | 264—51 XR |
| 2,962,738 | 12/1960 | Andrade et al. | |
| 3,200,176 | 8/1965 | Baxter | 264—54 |
| 3,268,635 | 8/1966 | Kraus et al. | 264—53 XR |
| 3,319,376 | 5/1967 | Doppelt et al. | |
| 3,389,198 | 6/1968 | Taber | 264—88 XR |
| 3,417,173 | 12/1968 | Harrison | 264—53 |
| 3,432,581 | 3/1969 | Rosen | 264—48 XR |
| 2,772,194 | 11/1956 | Fisher et al. | |

OTHER REFERENCES

Cram, D. J., "The Free Expansion of P.V.C. Using Azodicarbonamide," in British Plastics, January 1961, pp. 24–29.

Brandrup, J. E., Polymer Handbook, New York, Interscience, © 1966, pp. 4–194.

PHILIP E. ANDERSON, Primary Examiner

U.S. Cl. X.R.

46—156; 161—160, 161; 264—48, 88, 310